United States Patent [19]
Fruhwirth et al.

[11] Patent Number: 5,676,219
[45] Date of Patent: Oct. 14, 1997

[54] SYSTEM FOR CONTROLLING THE AXLE DIFFERENTIAL LOCKS OF AUTOMOTIVE VEHICLES

[75] Inventors: Gerhard Fruhwirth, Schonau; Johann Deinhofer, Peter In Der Au; Franz Stelzeneder, Steyr, all of Austria

[73] Assignee: Steyr-Daimler-Puck Aktiengesellschaft, Wien, Austria

[21] Appl. No.: 506,185

[22] Filed: Jul. 24, 1995

[30] Foreign Application Priority Data

Jul. 29, 1994 [DE] Germany .................. 44 27 040.2

[51] Int. Cl.$^6$ .................................................. B60K 28/16
[52] U.S. Cl. .................. 180/197; 180/338; 364/424.1; 192/4 A
[58] Field of Search .............................. 180/197, 337, 180/338; 364/424.1, 426.01, 426.03; 475/149, 150, 153; 192/4 A

[56] References Cited

U.S. PATENT DOCUMENTS

| | | | |
|---|---|---|---|
| 3,706,351 | 12/1972 | Neisch | 180/338 |
| 4,671,373 | 6/1987 | Sigl | 180/197 |
| 4,741,407 | 5/1988 | Torii et al. | 180/338 X |
| 4,821,601 | 4/1989 | Ouchi | 180/338 X |
| 5,220,975 | 6/1993 | Zimmer et al. | 180/197 |
| 5,505,267 | 4/1996 | Orbach et al. | 180/197 X |
| 5,548,513 | 8/1996 | Masuda et al. | 180/197 X |

*Primary Examiner*—Kevin Hurley
*Attorney, Agent, or Firm*—Bachman & LaPointe, P.C.

[57] ABSTRACT

In a system for the automatic control of form-locked clutches serving as differential lock in drive axles of a motor vehicle, in which control signals for a coupling actuator are formed by comparison of slippage signals with threshold values, both the engagement and the disengagement of the lock clutch are to be better adapted to the operating conditions which occur in practice. For this purpose, slippage sum signals (SSLR, SSFH) formed by integration of the speed differences (DFLR, DFVH) are compared with slippage sum thresholds (SSSLR1, SSSLR2, SSSVH1, SSSVH2) and the actuating time of the actuator is controlled as a function of further traveling conditions.

9 Claims, 7 Drawing Sheets

SYSTEM FOR CONTROLLING THE AXLE DIFFERENTIAL LOCKS OF AUTOMOTIVE VEHICLES

BACKGROUND OF THE INVENTION

The present invention relates to a system for the automatically controlling positively engaging clutches serving as differential lock in drive axles of a motor vehicle, in which, based on wheel speed signals of the driven axle and possibly steering signals, by comparison of slippage signals with threshold values, control signals for a clutch actuator are formed which effect the time-limited action thereof, the clutch remaining engaged after elimination of the actuating force by tensions in the drive line.

EP-A 510 457 describes form-locked clutches having a control system which, based on speed signals and their comparison with threshold values of the speed differences, controls an actuator. The single-acting actuator is actuated only for a short time, during a fixed "holding time", and the clutch disengages automatically by spring force upon the decrease of the torque transmitted. The present invention refers to such systems, particularly to axle differentials having such clutches. However, two axle differentials and an intermediate axle differential could also be present, such as used, for instance, in the case of vehicles with driven dual axles.

Such systems have already proven their worth, but they still leave room for improvement under certain traveling conditions, particularly in trucks with non-driven steering axle. On the one hand, the engagement takes places too late upon suddenly occurring slippage and thus steeply increasing difference in speed, but would take place more frequently than necessary in the case of a correspondingly reduced threshold value. On the other hand, under certain conditions of travel, the clutch disengages at the wrong time. To be sure, the system sees to it that the clutch is then immediately engaged again, but the number of switchings is nevertheless thereby increased and the tractive force is reduced or interrupted for a short time. These defects do not occur as much on severe terrains as in winter operation of trucks without all-wheel drive on icy roads. In addition to this, in the case of trucks with ASR (traction control) the slippage control can lead to undesired disengagement of the lock clutch due to reduction of the motor power. Accordingly, a matching or even cooperation of traction control and lock clutch would be desirable.

The object of the invention therefore is to adapt both the engagement and disengagement of the lock clutch or clutches of a system of this type better to the operating conditions which occur in actual practice.

SUMMARY OF THE INVENTION

In accordance with the invention, the foregoing object is achieved in the manner that slippage sum signals formed by integration of the speed differences are compared with slippage sum thresholds, and that the time of action of the actuator is controlled as a function of further traveling-condition signals. The forming of a slippage sum by integration of the speed difference over time has the result that, with a steeply increasing difference in speed, the switching takes place very rapidly, while with a flat or very slow rise or a slight speed difference, the switching takes place only after a longer time. Furthermore, even in the event of varying slippage, the judging thereof with the proper sign is possible and a disturbing number of unnecessary switchings is therefore also avoided.

The slippage sum has the dimension of an angle or of an arc measurement, and, due to this, the determination of the switch thresholds can also be better adapted to the mechanical circumstances of the corresponding lock clutch. The control of the action time of the actuator as a function of further signals makes it possible, while maintaining the advantageous concept of the merely brief action of the actuator of the practical and suitable disengagement criterion to control said traveling conditions in simple manner.

The action on the actuator in closing direction is preferably commenced when the transverse slippage sum reaches one of the first transverse slippage sum(s) thresholds and is then repeated and/or continued if certain conditions prevail when the clutch is still engaged; however, no actuation takes place when the clutch is not engaged. The continuation of the actuation as long as the actuator is still acted upon corresponds to a precautionary preventive lengthening of the "holding time", and it is therefore an act which takes place only in the control logic and is not related to any mechanical movement. The repetition of the actuation with the clutch still engaged has the purpose, in the event that the clutch has already been engaged for longer than the duration of the holding time, of preventing the disengagement thereof at the wrong time under certain situations. It can only take place if the clutch is still engaged, and therefore in precautionary manner upon occurrence of a situation in which the clutch could disengage. Without this precautionary action, the clutch could disengage and it would be necessary to wait, in individual cases, until the reaching of one of the first slippage sum thresholds permits a re-engagement. Thus, there is also assurance that no erroneous switchings, for instance, engagement at too high a speed difference, can occur.

A signal filtration is obtained in the manner that the integration of the slippage sums commences only when the speed difference to be integrated has reached a given value which is dependent on the steering angle. Otherwise, it could happen that very small deviations are integrated and engagement takes place without recognizable reason.

In similar fashion, it is useful to continue the time-limited actuation and/or to repeat it if and as long as the transmission clutch has or is released for a change in gear. This can be achieved most easily by a clutch pedal sensor. In this way, there is no danger that the lock clutch will automatically disengage by the interruption in the tractive force which is unavoidable in the case of a gear shift in the ordinary gear box.

In the case, for instance, of a rear axle differential, the transverse slippage sum is calculated from the difference in the speeds of rotation of the rear wheels. However, it may happen that, after engagement of the lock, both driven wheels are still rotating or that the torque transmitted (for instance, in the case of ice) is so small that it is no longer sufficient in order to keep the lock clutch engaged. This can be remedied by repeating and/or continuing the time-limited actuation if the difference in speed between driven and non-driven wheels is above a first threshold value. The remedy is even better if, also in case of the speed difference between driven and non-driven axle, the lengthwise slippage, the advantages of the slippage sum thresholds which have been generally pointed out above are utilized.

If a system in accordance with the invention is used in a vehicle having a slippage control which reduces the motor power, an advantageous further development consists in bringing about the reduction in the motor power when the lock clutch is already engaged and when the speed difference between the driven wheels and the undriven wheels is above a second threshold value, and that the time-limited action of the lock clutch is repeated and/or continued if and as long as the motor power has decreased. By the condition that the lock clutch must already be engaged and by the selection of a second threshold value, the time of the decrease in the motor power can be established independently but in vehicle-specific agreement with the control of the lock clutch. It is useful, in particular upon starting on icy slopes and therefore when a high motor power is used, to decrease the motor power only when this is absolutely necessary. This permits the best possible utilization of the motor power. If the lock clutch remains actuated for the duration of the reduction in the motor power, assurance is also had that the clutch will not disengage by itself at the wrong time. In this case also a refinement can be obtained by replacing the speed difference again by an integrated slippage sum.

However, there are also other possibilities for the coordinating of clutch control and reduction in motor power. If the reduction in motor power is already started when the transverse slippage sum reaches a second transverse slippage sum threshold which lies essentially within the region of the first slippage sum thresholds controlling for the engagement of the clutch, and if this is related, as condition, to the unengaged lock clutch, then the engagement of the clutch in the case of rapidly increasing speed difference can be supported and accelerated by reduction in the motor power, as the result of which the speed difference also decreases. In other words, the upper one of the first slippage sum thresholds is prevented from being reached so rapidly that the lock clutch can no longer be engaged in due time.

Upon the selection of the second slippage sum threshold, account is also to be taken of the structural circumstances of the drive line. Thus, for instance, in the case of high motor torque and low moment of inertia, the second slippage sum threshold may already lie below the first so that each engagement of the lock clutch is supported. In the opposite case, the second slippage sum threshold will lie above the first and thus act only when the engagement of the lock clutch has not taken place. This second further development can be realized independently of the first, but it can also be obtained jointly with it.

Finally, it is also advantageous if the switch position of the clutch is not effected by a sensor which can fail, but by comparison of the speeds of rotation of the wheels in question. Since the speed signals of the control are in any event available, this is possible without additional hardware expense and has the advantage of determining the condition at the place where it is decisive.

BRIEF DESCRIPTION OF THE DRAWINGS

The invention will be explained and described below with reference to the drawings, in which.

DETAILED DESCRIPTION

Figure 1:
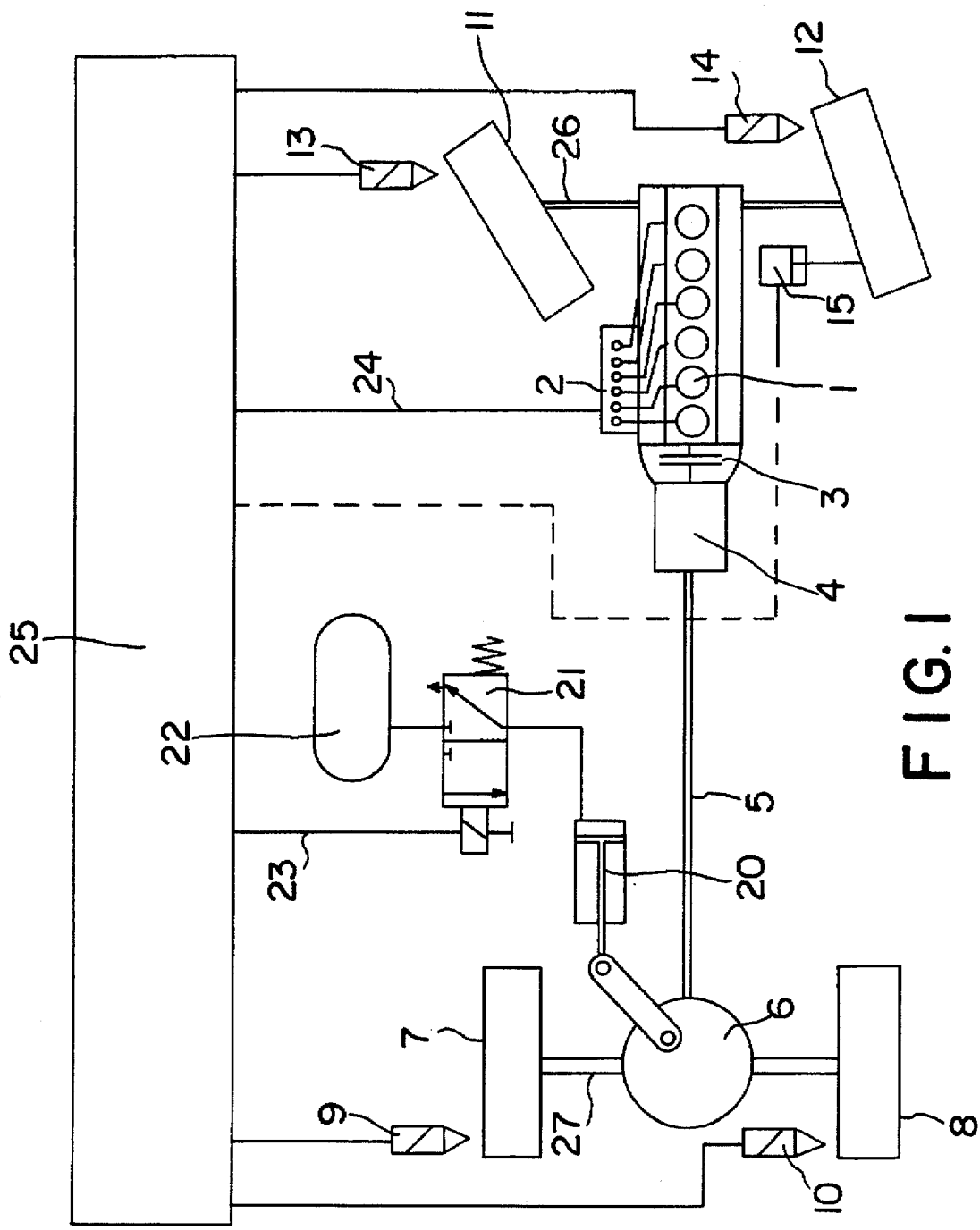
FIG. 1 is a diagram of a vehicle provided with the system in accordance with the invention.

In FIG. 1, the motor of the vehicle is designated 1, its power control unit is 2; here, there is concerned, for instance, an injection pump having a power controller to which a desired power value is fed in known manner by the gas pedal. The motor 1, via a transmission clutch 3, drives a transmission 4, and a universal shaft 5 drives a lockable rear-axle differential 6 which is connected to drive axle (rear-axle) 27 for drive with the rear drum wheels 7, 8. The front wheels 11, 12 are not driven, but are steerable on non-driven axle 26. All four wheels, 7, 8, 11, 12, are provided with speed sensors 9, 10, 13, 14. A steering-angle sensor 15 can be provided. The steering angle can, however, also be obtained by calculation from the difference in speed of the non-driven wheels 11, 12.

The rear-axle differential 6 is provided, for complete locking, with a form-locked clutch as is known in the art from EP-OS 510,457 (U.S. Pat. No. 5,335,764) and, therefore, not shown, which is acted on in the closing direction by an actuator 20 acted on by pressurized fluid for instance. As described in further detail in EP-OS 510 457, the lock clutch remains engaged by the torque transmitted as long as the torque is sufficiently great or different from zero, whereupon it opens automatically under the force of a spring. The pressure fluid is fed to the actuator 20 from a source of pressure 22 via a control valve 21. The latter, in its turn, is in communication via a control line 23 with the control device 25, for instance a microprocessor. Furthermore, a control line 24 via which a reduction in the motor power is brought about can also be provided in a further embodiment of the system of the invention.

Figure 2:
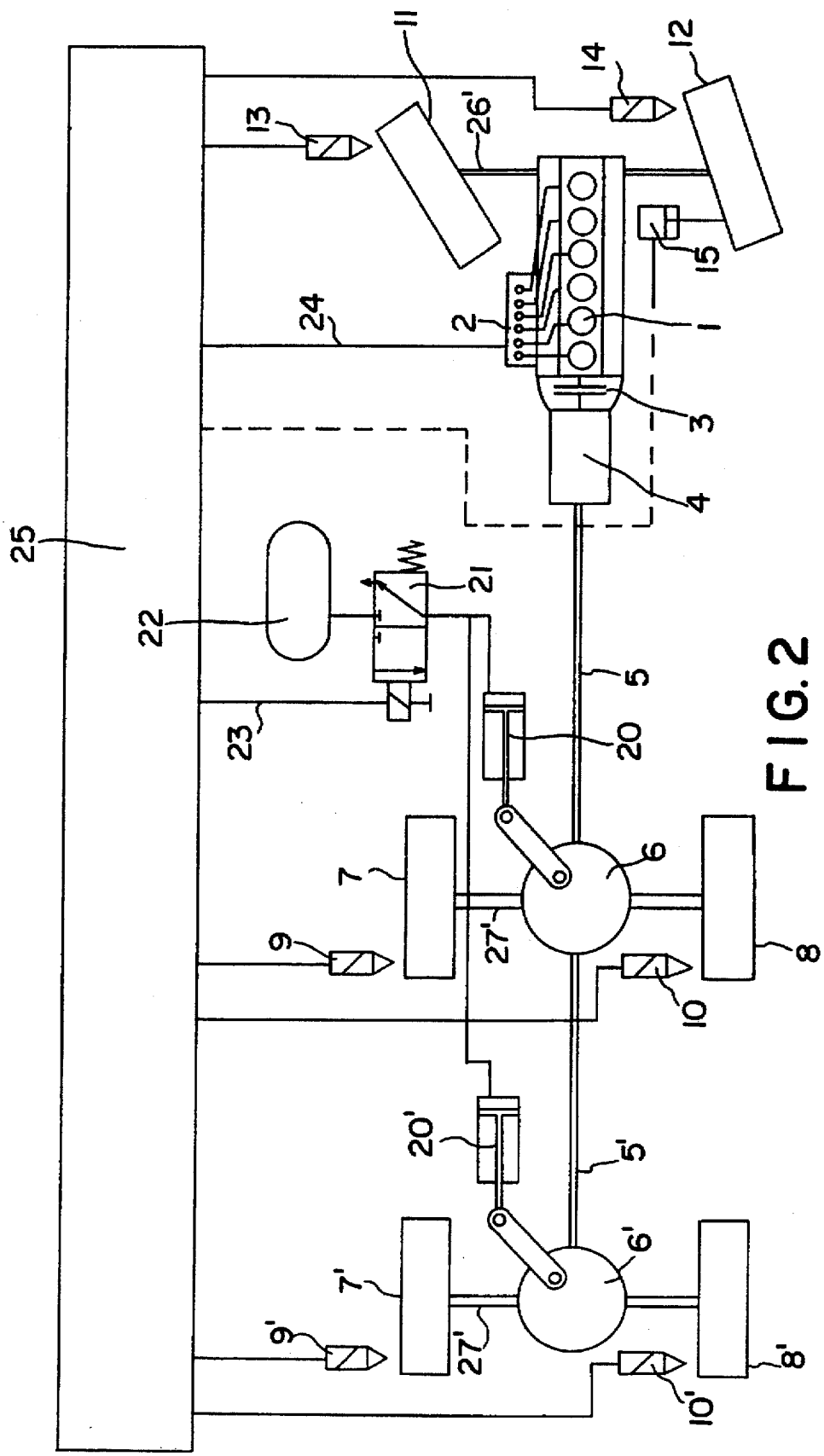
FIG. 2 is similar to FIG. 1, but of a vehicle with dual axles.

FIG. 2 shows the same vehicle with dual axles, the reference numbers of the added second rear axle and corresponding parts being provided with an apostrophe.

Figure 3:
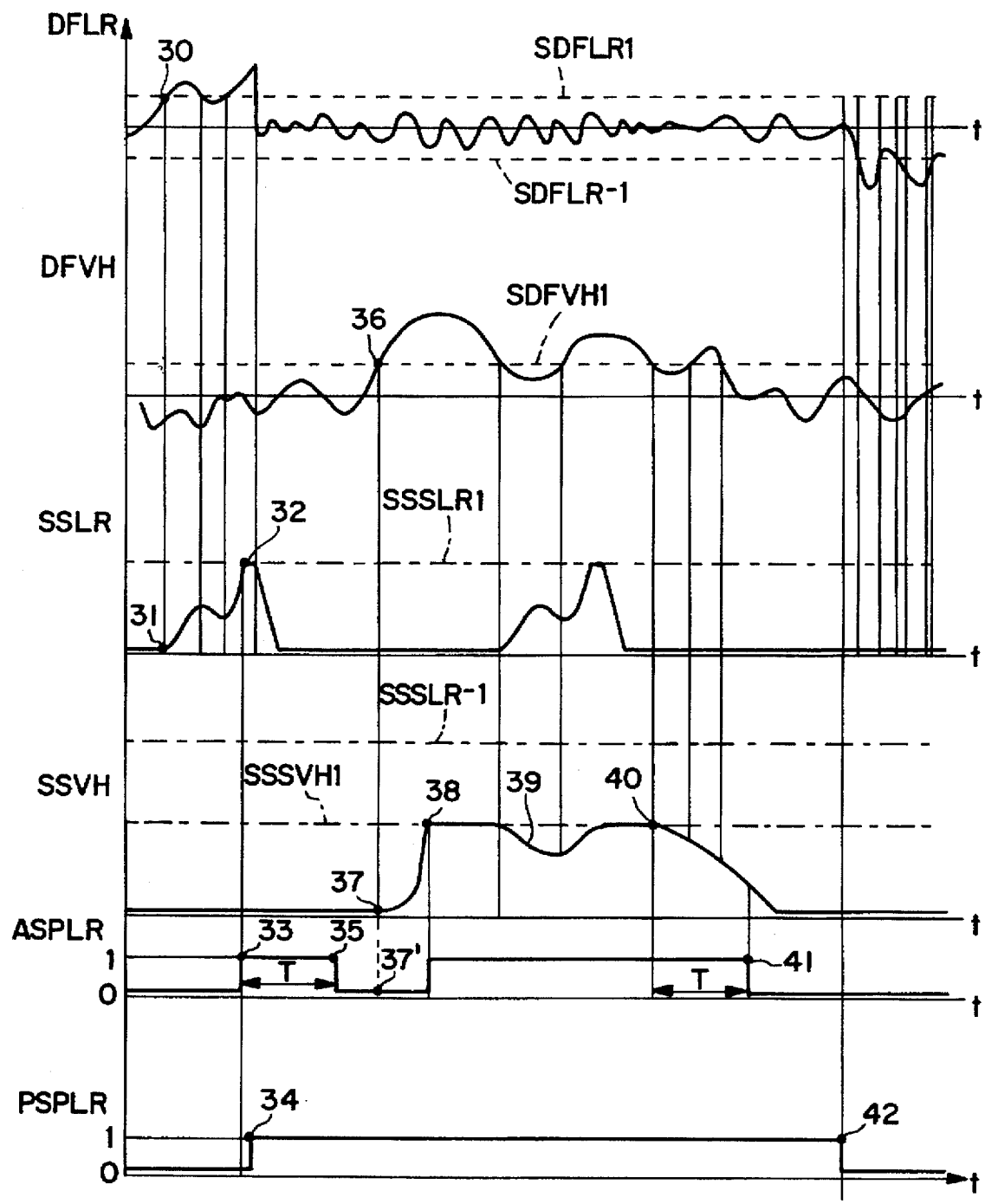
FIG. 3 is a time graph of the switch processes of a system in a first embodiment.

In FIG. 3 the functions carried out by the control system are shown. For this, the change with time and threshold values of the following magnitudes are shown one above the other:

(Note: L=Left; R=Right; V=Front; H=Rear; S=Threshold; SS=Slippage Sum; SSS=Slippage Sum Threshold; DF=Speed Difference)

Speed difference of the rear wheels 7, 8: DFLR, threshold values SDFLR1 and SDFLR−1, upon the exceeding of which the integration of DFLR commences;

Difference between the front-axle and rear-axle speeds: DFVH, first threshold value SDFVH1, upon the exceeding of which the integration of DFVH commences;

Transverse slippage sum SSLR obtained by integration of DFLR, first transverse slippage sum thresholds SSSLR1, SSSLR−1, upon the exceeding of which the actuator 20 is operated;

Lengthwise slippage sum obtained by integration of DFVH: SSVH, first lengthwise slippage sum threshold SSSVH1, upon the exceeding of which the action of the actuator 20 is continued and/or repeated;

Actuator 20 of the transverse lock acted on or not: ASPLR;

Position of the lock clutch: PSPLR.

First of all, the normal engagement process: If, for instance, at 30 DFLR exceeds the threshold SDFLR1, then the integration over DFLR is commenced at 31. If SSLR then exceeds the threshold SSSLR1 at 32, the actuator 20 of the transverse lock is acted on (33, where ASPRL=1) and shortly thereafter the transverse lock is engaged (34, where PSPRL=1). The actuator is now held acted on for a constant holding time T, whereupon the actuator drops out (35), but the clutch remains engaged.

Now, further traveling-condition signals reach the control device 25: Both driven and coupled drive wheels spin, which is expressed by an increasing difference between the speed of rotation of the front and rear axles; DFVH exceeds the threshold SDFVH1 at 36. In this way, the repeated action of the lock actuator 20 could already take place (the clutch is still engaged), for instance at 37'. This is indicated only in dashed line, since it is nicer in this way to begin the integration of DFVH to SSVH only at 37. If SSVH exceeds the threshold SSSVH1 at 38, then the actuator is preventively acted on at 39 and remains so for the duration of the exceeding, plus a fixed holding time T. Due to this holding time T, the descent of the curve at 39 does not lead to any decline of the action. The descent again of the curve at 40 however does; the actuator drops out at 41 after the holding time T. At 42, the lock clutch finally also opens due to the excessively small torque transmitted (which cannot be noted on the different curves).

Figure 4:
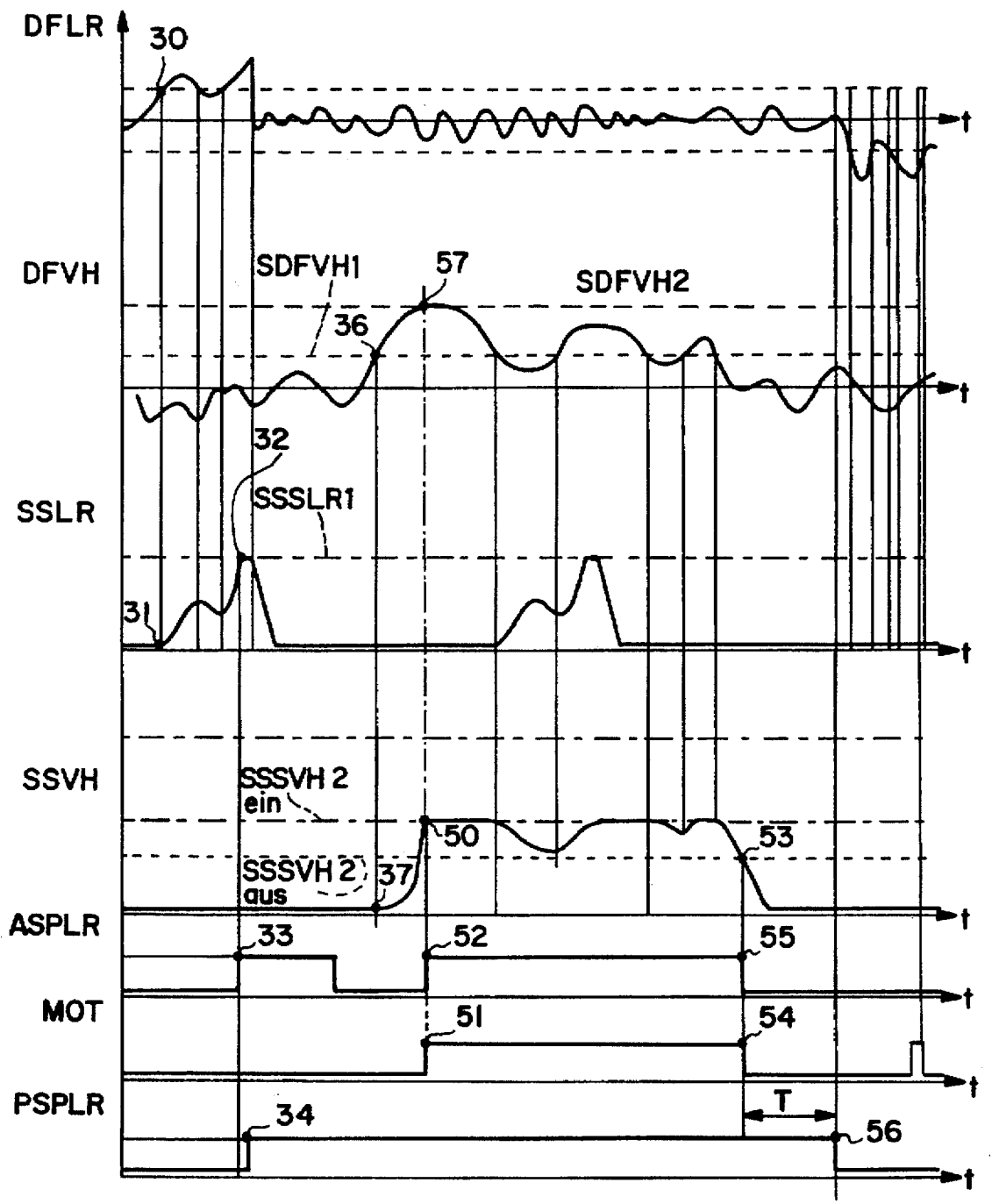
FIG. 4 is a time graph of the switch processes of a system in a second embodiment.

The system of FIG. 4 differs from this only by possibility of the decrease of the motor power. For this, the thresholds SSSVH2ein (SSSVH2on) and SSSVH2aus (SSSVH2off) are furthermore provided. Accordingly, the curve MOT is also included in the lower part of the figure. The traveling condition is the same and the course of the curve also the same up to point 38 in FIG. 3. There, SSVH reaches the first lengthwise slippage sum threshold SSSVH1. In FIG. 4, SSVH reaches the second lengthwise slippage sum threshold SSSVH2ein for the reduction of the motor power at the analogous point 50. Since the transverse lock is already engaged, PSPLR is equal to 1, and, in this way, the motor power is immediately decreased (MOT=1 at 51) and at the same time, at 52, the lock actuator is also actuated as a precautionary measure, ASPLR=1 (since the lock is closed, this can also take place immediately). The motor power remains reduced until SSVH drops below the second lengthwise slippage sum threshold SSVH2aus at 53. For the reduction in the motor power, a hysteresis is provided here, but another, suitably selected holding time could also be provided instead of this. In this way, the motor power is again increased without delay (54) and the actuation of the lock is eliminated (55). The lock clutch itself can drop out only after the holding time T. In a simplified embodiment, the reduction in the motor power could also be brought about when DFVH at point 57 reaches the limit value SDFVH2, which lies above SDFVH1. The corresponding vertical time line to 52 is entered as dashed line.

Figure 5:
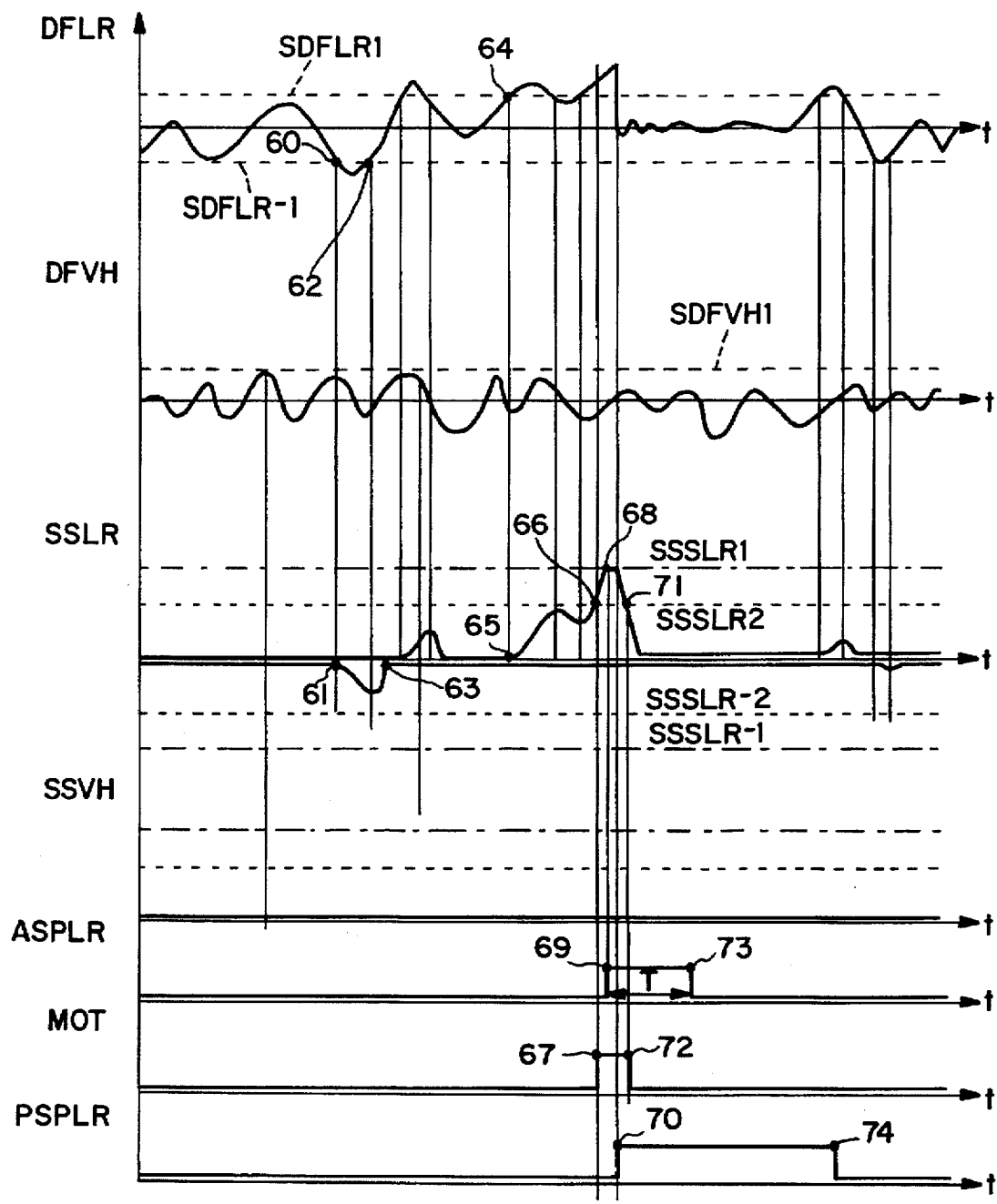
FIG. 5 is a diagram of the switch processes of a system in a third embodiment.

In FIG. 5, the action of the slippage sum thresholds as slippage criterion for the engagement and the engagement aid by reduction of the motor power can furthermore be noted.

At 60, the varying transverse slippage curve DFLR reaches the threshold SDFLR. In accordance with the prior art, the reaching of a threshold lying at about this height would already effect the engagement of the clutch. As can be noted from the course of DFLR, there is concerned a periodic variation and the engagement would not be necessary at all. In accordance with one aspect of the invention, as a result of the exceeding of the threshold at 60, the integration for the formation of the transverse slippage sum SSLR is started, however, only at 61. At 62, the transverse slippage (the difference in the speeds of rotation of the right and left driven wheels) has already dropped to such an extent that the slippage sum is again zero at 63. The first slippage sum threshold SSSLR1 provided for the engagement of the lock has not been reached at all. An unnecessary engagement has therefore been omitted.

At 64, the transverse slippage curve DFLR again reaches the threshold SDFLR1 and the formation of the transverse slippage sum SSLR commences at 65. At 66, it reaches the second transverse slippage sum threshold SSSLR2, which results in a reduction in the motor power at 67. If the curve would not rise further, the decline in the motor power would only be very brief and scarcely noticeable, due to the inertia. Since it (SSLR), however, continues to rise, it reaches at 68 the first transverse slippage sum threshold SSSLR1, as a result of which the coupling actuator is acted on at 69 and immediately thereafter the clutch is also actually engaged at 70. This acts, and the curve SSRL again drops, until it passes at 71 the second transverse slippage sum threshold SSSLR2 again in the other direction. In this way, the motor power is again increased, 72. During the fixed holding time T, the actuator remains activated and drops off at 73. The clutch, however, still remains engaged up to 74; it then opens due to too small a torque. With proper matching of the two transverse slippage sum thresholds to each other, the reduction in the motor power thus supports the engagement of the clutch.

Figure 6A:
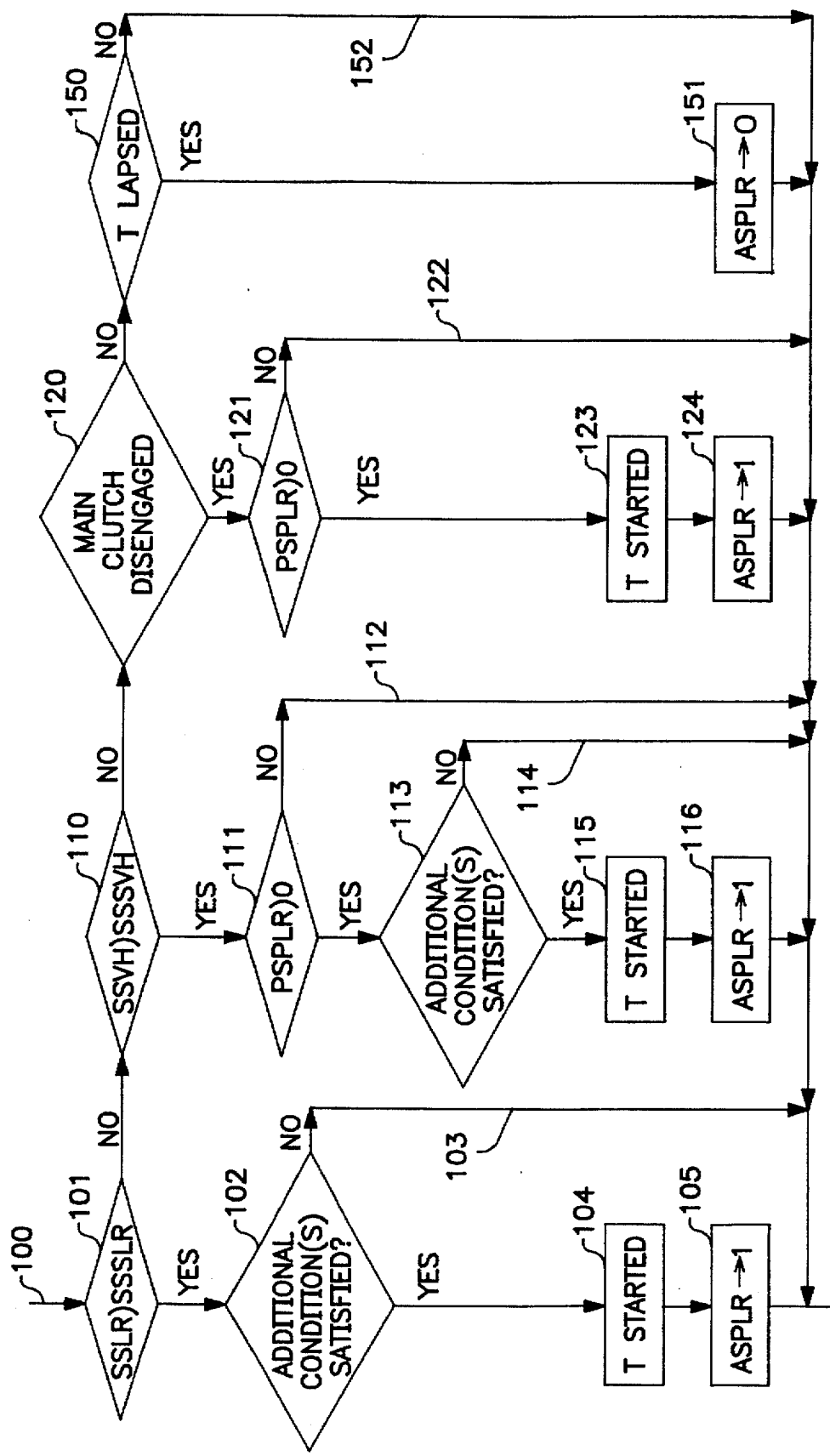
FIGS. 6a and 6b are a flow chart of the system of the invention in the form of a block diagram.
Figure 6B:
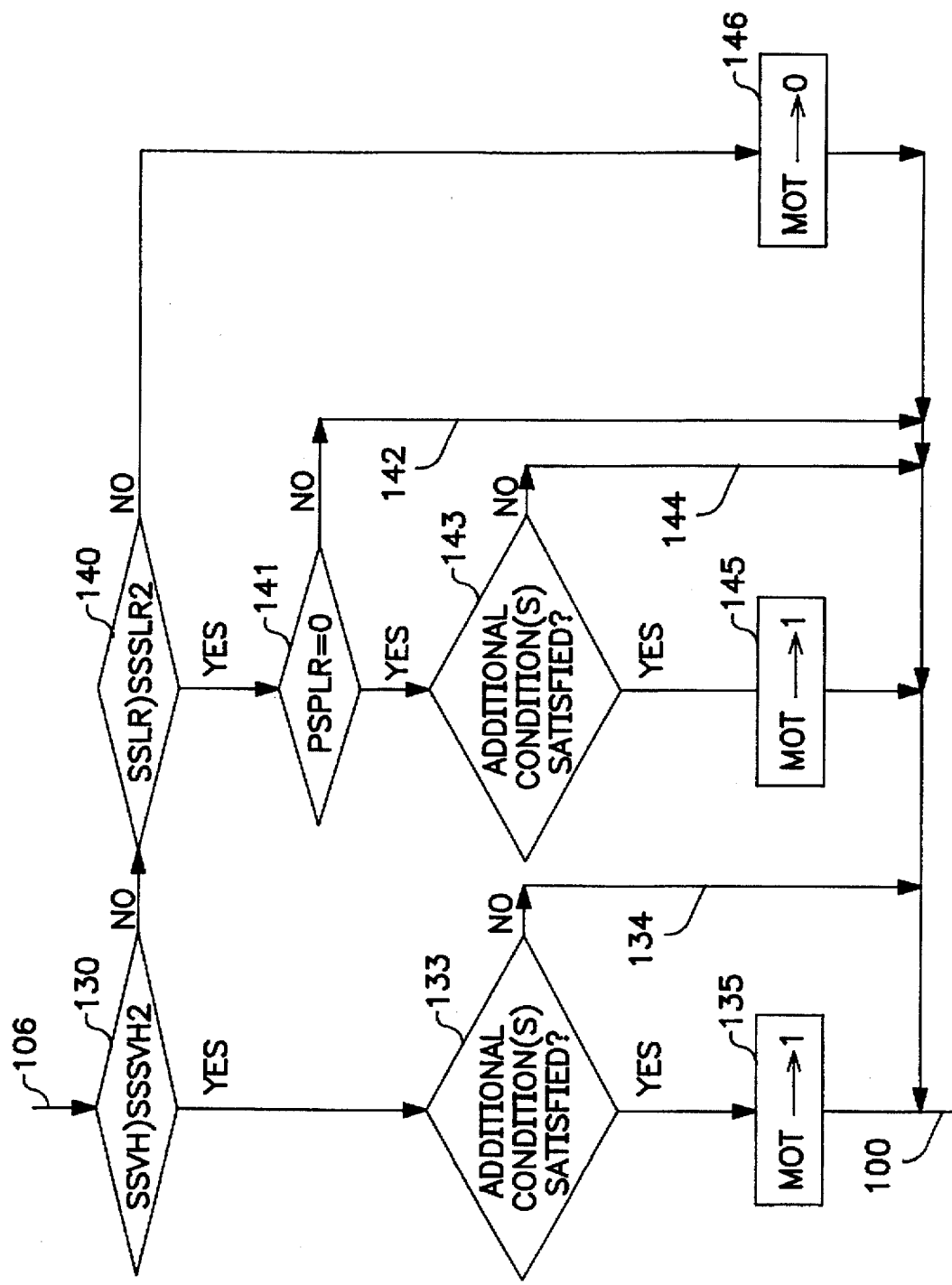

FIG. 6a (of which FIG. 6b is a continuation) shows the simplified decision diagram for the system without motor engagement. In this connection, the decision boxes are passed through repetitively. The decision boxes 101 to 105 show the course when no further traveling conditions are present. At 101 it is decided whether the transverse slippage sum SSLR has already reached the transverse slippage sum threshold SSLR. SSLR stands in simplifying manner for SSLR1 and SSLR31 1, depending on whether the speed difference is positive or negative. If the threshold is exceeded, it is then checked at 102 whether further additional conditions for the engagement of the lock clutch are satisfied. One example of such an additional condition would be that the lock clutch should no longer be engaged because of too great a speed difference over the speed difference SFLR. If the additional conditions are not satisfied at 102, one passes from 103 to 106 and from there back to 100. The cycle therefore begins over again without the lock being controlled. If the additional conditions are satisfied at 102, then the time counting is commenced at 104, it being set to the fixed holding time T, and then the actuator of the lock clutch is acted on at 105.

If the answer "no" has been given in the decision box 101, then it is furthermore decided at 110 whether the lengthwise slippage sum SSVH formed by integration of the difference of the speeds of rotation between front and rear wheels is greater than a first lengthwise slippage sum threshold SSSVH1. This means that the slippage of the driven wheels as a whole, and therefore as compared with the non-driven wheels, is impermissibly high. If it is now found at 111 that the lock clutch is not engaged (PSPLR=0), then one again passes, via 112 and 106, to 100. However, if it is engaged (PSPLR=1), then, after checking further additional conditions at 113 and bypass 114, if they are not satisfied, the time counting is started again at 115 and the actuation of the lock actuator is caused at 116.

If no impermissible slippage of the driven axle is noted in box 110, one passes to 120. If the transmission clutch is released, for instance in order to shift a gear, inquiry is made at 121 whether the lock clutch is engaged (this would be PSPLR=1). If not, then one returns again to 100 via 122. If not, then the time counting is started again at 123 and the lock actuator is acted on at 124 (ASPLR=1). If the transmission clutch is not disengaged (N in box 120), then inquiry is made in box 150 as to whether the holding time T has run out. If it has, then the actuator drops out (box 151), but the clutch remains engaged in the event of sufficient torque. If it has not, then the cycle is repeated via 152, i.e., one again passes via 106 to 100.

The following decision boxes 130 to 146 are only present in the case of a system with reduction of the motor power. In that case, the box 130 of FIG. 6b is connected via line 106 to FIG. 6a. In box 130 it is decided whether the lengthwise slippage sum SSVH has exceeded the second lengthwise slippage sum threshold SSSVH2. If so, it is then check at 133 whether there are additional conditions. If not, one proceeds via 134; if so, then the reduction in the motor power to a specific extent is brought about at 135.

The motor power can, however, also be reduced for another purpose if the transverse slippage sum exceeds a second transverse slippage sum threshold SSSLR2 which lies in the vicinity of and preferably even somewhat below, the first transverse slippage sum threshold SSSLR1. This is the box 140. If so, it is then checked at 141 whether the lock clutch is engaged. If it is (PSPLR=1), then one returns via 142 to 100. If it is not (PSPLR=0), then, after checking further additional conditions (143), a reduction in the motor power is brought about at 145. If the second slippage sum threshold SSSLR2 is smaller than the first (SSSLR1), which decides as to the engagement of the lock clutch is reached, the motor power is reduced as a precautionary measure. If then, shortly thereafter, the command for engagement of the lock clutch is also given, then the speed of rotation now only rises more slowly, which facilitates the engagement of the lock clutch. The second transverse slippage sum threshold can, however, also be selected greater than the first transverse slippage sum threshold SSSLR1ein which is controlling for the engagement of the clutch, but smaller than the second slippage sum threshold SSSLR2aus, via which the clutch can no longer be engaged. In accordance with the prior art, in such a situation the driver had to reduce the amount of gas in order to start a new attempt at engagement. The automatic reduction in motor power does this for the driver. If it is noted at 140 that the transverse slippage sum has again dropped again below the second transverse slippage sum threshold, then the reduction in the motor power is again done away with at 140 (MOT=0).

It can be noted from FIGS. 3 to 5 that, despite the constant holding time T, the actual duration of action changes. Every repetition or continuation of the action as a function of the further traveling conditions causes a lengthening of the actuating time, to which then, in each case, the constant holding time T is appended again "at the rear".

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. In a motor vehicle having at least one drive axle having a pair of driven wheels, a motor for imparting power to the at least one drive axle, a non-driven axle having a pair of steerable wheels, and a transmission clutch; an arrangement for controlling a lock clutch, acting as differential lock in the drive axle having a pair of driven wheels, in response to a first motor vehicle travel condition comprising the transverse slippage between the driven wheels of the drive axle comprising:

(a) means for continuously determining speed difference between the driven wheels of the drive axle;
    (b) means for integrating the determined speed difference between the driven wheels of the drive axle to obtain an actual transverse slippage sum when said speed difference exceeds a given value which is dependent on a steering angle;
    (c) means for continuously comparing the actual transverse slippage sum with first transverse slippage sum thresholds to continuously determine if and when the actual transverse slippage sum exceeds a first transverse slippage sum threshold; and
    (d) actuating means energized for engaging the lock clutch when it is determined that the actual transverse slippage sum exceeds the first transverse slippage sum threshold and not energized when it is determined that the actual transverse slippage sum does not exceed the first transverse slippage sum threshold, said actuating means being energized only for a predetermined time after each determination that the actual transverse slippage sum exceeds the first transverse slippage sum threshold.

2. An arrangement according to claim 1 including means for continuously monitoring a further motor vehicle travel condition for maintaining the lock clutch engaged by energizing the actuating means.

3. An arrangement according to claim 2 wherein said means for continuously monitoring a further motor vehicle travel condition includes means for monitoring when the transmission clutch is open.

4. An arrangement according to claim 2 wherein said means for continuously monitoring a further motor vehicle travel condition includes means for monitoring the speed difference between the driven wheels of the drive axle and the steerable wheels of the non-driven axle and comparing the difference with a threshold.

5. An arrangement according to claim 4 including means for integrating the speed difference between the driven wheels of the drive axle and the steerable wheels of the non-driven axle to determine the actual lengthwise slippage sum and comparing the actual lengthwise slippage sum with first lengthwise slippage sum threshold.

6. An arrangement according to claim 2 including means for reducing the motor power in order to limit the transverse slippage of the driven wheels wherein the reduction in the motor power takes place when the lock clutch is already engaged and when the speed difference between the driven wheels of the drive axle and the steerable wheels of the non-driven axle lies above a second lengthwise slippage sum threshold and the actuating means is energized as long as the motor power is reduced.

7. An arrangement according to claim 5 wherein the reduction of the motor power takes place when the lock clutch is already engaged and when the actual lengthwise slippage sum lies above a second lengthwise slippage sum threshold, the actuating means is energized as long as the motor power is reduced.

8. An arrangement according to claim 2 including means for reducing the motor power, wherein the reduction in the motor power takes place when the actual transverse slippage sum reaches a second transverse slippage sum threshold which lies substantially in the region of the first transverse slippage sum threshold which is controlling for the engagement of the clutch and wherein the reduction of the motor power is related to the condition that the lock clutch is not engaged.

9. An arrangement according to claim 1 wherein engagement of the lock clutch is monitored by comparison of the slippage of the driven wheels.

* * * * *